(12) United States Patent
Abramov

(10) Patent No.: US 9,876,266 B2
(45) Date of Patent: Jan. 23, 2018

(54) CONTACTLESS CONNECTOR

(71) Applicant: Tyco Electronics Corporation, Berwyn, PA (US)

(72) Inventor: Sergei Abramov, South San Francisco, CA (US)

(73) Assignee: TE Connectivity Corporation, Berwyn, PA (US)

(*) Notice: Subject to any disclaimer, the term of this patent is extended or adjusted under 35 U.S.C. 154(b) by 229 days.

(21) Appl. No.: 14/502,330

(22) Filed: Sep. 30, 2014

(65) Prior Publication Data
US 2016/0094090 A1  Mar. 31, 2016

(51) Int. Cl.
| | | |
|---|---|---|
| *H02J 17/00* | (2006.01) | |
| *H01Q 1/22* | (2006.01) | |
| *H01Q 1/24* | (2006.01) | |
| *H04M 1/02* | (2006.01) | |
| *H04B 5/00* | (2006.01) | |

(52) U.S. Cl.
CPC ............ *H01Q 1/22* (2013.01); *H01Q 1/243* (2013.01); *H02J 17/00* (2013.01); *H04B 5/0031* (2013.01); *H04B 5/0037* (2013.01); *H04M 1/0274* (2013.01)

(58) Field of Classification Search
CPC .................................. H01Q 1/22; H02J 17/00
USPC .......................................................... 343/906
See application file for complete search history.

(56) References Cited

U.S. PATENT DOCUMENTS

| | | | |
|---|---|---|---|
| 5,015,202 A | 5/1991 | Blumentritt et al. | |
| 5,397,971 A | 3/1995 | McAllister et al. | |
| 6,145,053 A | 11/2000 | Smith | |
| 6,539,790 B2 | 4/2003 | Huston et al. | |
| 2007/0117450 A1* | 5/2007 | Truxes | F21V 23/06 439/490 |
| 2012/0177323 A1* | 7/2012 | Schwandt | G02B 6/4292 385/57 |
| 2013/0170797 A1* | 7/2013 | Ott | G02B 6/3885 385/60 |

(Continued)

OTHER PUBLICATIONS

Alix Preston, Benjamin Balaban, Gabriel T. Boothe, Guido Mueller, Stable Materials and Bonding Techniques for Space-Based Optical Systems, 5 pages, University of Florida, Gainesville, FL.

*Primary Examiner* — Dameon E Levi
*Assistant Examiner* — David Lotter

(57) ABSTRACT

A contactless connector includes a housing having a mating interface configured to be coupled to a connector interface of an electronic device. A connector communication module is held at least partially within the housing and is operable in a transmit mode and/or a receive mode of operation. The connector communication module is configured to wirelessly communicate with a device communication module of the electronic device to wirelessly transfer at least one of data or power between the connector communication module of the contactless connector and the device communication module of the electronic device. An optical contacting element is held by the housing. The optical contacting element is configured to optically contact an optical contacting element of the electronic device such that the housing is mechanically connected to the electronic device with the connector communication module configured to wirelessly communicate with the device communication module.

20 Claims, 2 Drawing Sheets

(56) References Cited

U.S. PATENT DOCUMENTS

| | | | | |
|---|---|---|---|---|
| 2014/0072261 A1* | 3/2014 | Isenhour | ............... | G06F 1/1632 385/33 |
| 2014/0252876 A1* | 9/2014 | Riezebos | ................ | H01F 38/14 307/104 |
| 2014/0270790 A1* | 9/2014 | Copper | .............. | H04B 10/2575 398/117 |
| 2015/0048907 A1* | 2/2015 | Almgren | ............. | H04B 5/0031 333/24 R |
| 2015/0349847 A1* | 12/2015 | Hassan-Ali | .......... | H04B 5/0037 455/41.1 |
| 2016/0091678 A1* | 3/2016 | Qian | ................... | G02B 6/4206 398/142 |

\* cited by examiner

CONTACTLESS CONNECTOR

BACKGROUND OF THE INVENTION

The subject matter herein relates generally to contactless connectors.

Connectors are known for providing data and power links to electronic devices, such as mobile devices, wearable electronic devices, hand held devices, and/or the like. The connectors supply power to the electronic device (e.g., to recharge a battery of the electronic device) and/or transmit data to and/or from the electronic device.

Known connectors for such electronic devices are not without disadvantages. For example, at least some known electronic devices include a receptacle or other cavity that receives a plug of the corresponding connector therein, which may unnecessarily occupy space within the electronic device, may interfere with functionality of the electrical device, may affect reliability of the connector and/or the electronic device, and/or may affect the aesthetic appearance of the electronic device. For example, such plug connectors and the electronic device's receptacle typically have exposed signal contacts that may be susceptible to damage, deterioration, and/or wear over time. Also, some electronic device manufacturers desiring water resistant or waterproof devices may have a need to use connectors that prevent water, humidity, dust, and/or salt penetration and/or condensation from occurring through the connector.

At least some known connectors for electronic devices use magnets to align, guide, and/or mechanically connect (i.e., physically secure) the connector to the electronic device. Some magnets may be bulky, may unnecessarily occupy space within the electronic device, and/or may interfere with functionality of the electronic device. Some magnets that are sufficiently small to be incorporated within current electronic devices may lack sufficient force to reliably and physically secure the connector to the electronic device. Moreover, magnets in wearable devices may also create other unintended effects due to static magnetic fields. Other methods of physically securing the connector to the electronic device (e.g., adhesives, hook and loop fasteners (e.g., Velcro®), latches, and/or other mechanical fasteners) may suffer from some similar disadvantages as magnets, but may also have other reliability and/or usability issues that prevent such other methods from being reliable and/or cost effective for physically securing the connector to the electronic device.

BRIEF SUMMARY OF THE INVENTION

In an embodiment, a contactless connector includes a housing that extends between a mating end and a terminating end. The housing has a mating interface at the mating end that is configured to be coupled to a connector interface of an electronic device. The contactless connector includes a connector communication module held at least partially within the housing. The connector communication module is operable in at least one of a transmit mode of operation or a receive mode of operation. The connector communication module is configured to wirelessly communicate with a device communication module of the electronic device to wirelessly transfer at least one of data or power between the connector communication module and the device communication module of the electronic device. An optical contacting element is held by the housing. The optical contacting element is configured to optically contact an optical contacting element of the electronic device such that the housing is mechanically connected to the electronic device with the connector communication module configured to wirelessly communicate with the device communication module.

In an embodiment, a contactless connector includes a housing that extends between a mating end and a terminating end. The housing has a mating interface at the mating end that is configured to be coupled to a connector interface of an electronic device. A connector communication module is held at least partially within the housing. The connector communication module is operable in at least one of a transmit mode of operation or a receive mode of operation. The connector communication module is configured to wirelessly communicate with a device communication module of the electronic device to wirelessly transfer at least one of data or power between the connector communication module of the contactless connector and the device communication module of the electronic device. An optical contacting element is held by the housing. The optical contacting element includes an optical contacting surface that is configured to bond with an optical contacting element of the electronic device such that the housing is mechanically connected to the electronic device with the connector communication module configured to wirelessly communicate with the device communication module.

In an embodiment, a contactless connector includes a housing that extends between a mating end and a terminating end. The housing has a mating interface at the mating end that is configured to be coupled to a connector interface of an electronic device. A connector communication module is held at least partially within the housing. The connector communication module is operable in at least one of a transmit mode of operation or a receive mode of operation. The connector communication module is configured to wirelessly connect with a device communication module of the electronic device to wirelessly transfer at least one of data or power between the connector communication module of the contactless connector and the device communication module of the electronic device. An optical contacting element is held by the housing. The optical contacting element is configured to mechanically connect with an optical contacting element of the electronic device such that the housing is mechanically connected to the electronic device. The optical contacting elements of the contactless connector and the electronic device are at least one of transparent or non-conductive to radio frequency waves to allow the connector communication module to wirelessly transfer at least one of data or power through the optical contacting elements of the contactless connector and the electronic device.

DETAILED DESCRIPTION OF SPECIFIC EMBODIMENTS OF THE INVENTION

Figure 1:
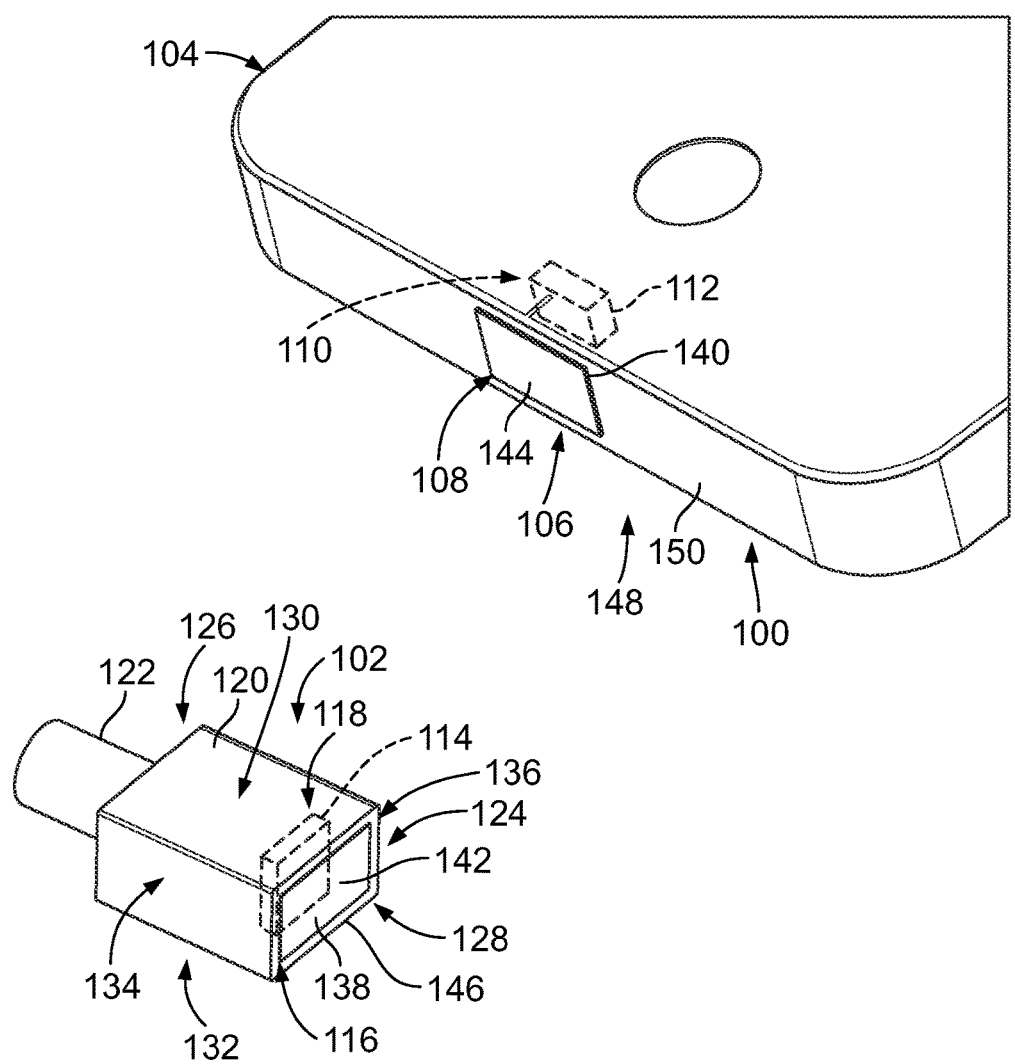
FIG. 1 illustrates an electronic device and contactless connector formed in accordance with an exemplary embodiment.

FIG. 1 illustrates an electronic device 100, only a portion of which is shown, and contactless connector 102 formed in accordance with an exemplary embodiment. The contactless connector 102 is used to power the electronic device 100 and/or transfer data to and/or from the electronic device 100. The electronic device 100 communicates wirelessly with the contactless connector 102 without the need for abutting electrical contacts for power and/or data transfer. For example, the electronic device 100 may wirelessly communicate with the contactless connector 102 electromagnetically, inductively, capacitively, and/or by other means. For purposes of the present disclosure, the terms "wirelessly communicate", "contactless data communication", "contactless", and the like are used to mean data and/or power transfer provided without use of conductive contact terminals requiring physical and electrical connection to transfer data signals and/or power to associated conductive contact terminals in a mating connector. Optionally, the electronic device 100 may communicate data signals via radio frequency ("RF") with the contactless connector 102. For purposes of the present disclosure, the term "RF" is used broadly to include a wide range of electromagnetic transmission frequencies including, for instance, those falling within the radio frequency, microwave, and millimeter wave frequency ranges. As described further below, the data and/or power communication may be one-way communication in some embodiments or duplex or two-way communication in other embodiments.

The electronic device 100 may be any type of electronic device. For example, the electronic device 100 may be a mobile device. According to other embodiments, the electronic device may be a wearable electronic device, such as, but not limited to, an athletic watch, a health monitoring device, electronic glasses, electronic goggles, a headset, headphones, fashion electronics, other clothing and/or accessories having electronics embedded therein that are wearable by a user, and/or the like. Also, the electronic device 100 may be a hand held device, such as, but not limited to, a cellular phone, a tablet, a global positioning system device, another type of handheld device, and/or the like.

The electronic device 100 includes a device housing 104 having a connector interface 106 at any location along the device housing 104, such as, but not limited to, at an end of the device housing 104. The connector interface 106 may be a separate connector interface mechanically installed into the device housing 100 or may be a connector interface seamlessly integrated into the device housing 100, according to various embodiments. The electronic device 100 includes a mechanical securing mechanism 108 and a contactless communication interface 110. In another embodiment, the electronic device 100 may include a receptacle having the securing mechanism 108 and/or the contactless communication interface 110. Optionally, the contactless connector 102 may be coupled to the electronic device 100 in multiple orientations. For example, the contactless connector 102 may be flipped approximately 180° degrees for a right-side up or an upside down connection with the electronic device 100.

The electronic device 100 includes a device circuit board (not shown) within the device housing 104. Any type of electronic component(s) (not shown) may be mounted to the device circuit board, such as, but not limited to, a memory, processor, battery, sensor, antenna, communication chip, and/or the like. Any number of device circuit boards may be provided inside the device housing 104.

The contactless communication interface 110 of the electronic device 100 includes a contactless communication module 112 held at least partially within the device housing 104. The contactless communication module 112 is configured to transmit and/or receive data and/or power. For example, as described below, the contactless communication module 112 is configured to wirelessly communicate with a contactless communication module 114 of the contactless connector 102 to wirelessly transfer data and/or power between the contactless communication module 114 of the contactless connector 102 and the contactless communication module 112 of the electronic device 102. The contactless communication module 112 may be referred to herein as a "device communication module". The contactless communication module 114 may be referred to herein as a "connector communication module".

The contactless communication module 112 may include any structure, electronics, device, and/or the like that enables the contactless communication module 112 to wirelessly communicate with the contactless communication module 114 of the contactless connector 102, such as, but not limited to, a contactless transmit chip configured to wirelessly transmit data from the electronic device 100, a contactless receive chip configured to wirelessly receive data from the contactless connector 102, a contactless receive chip configured to wirelessly receive power from the contactless connector 102, a contactless power terminal configured to wirelessly receive power from the contactless connector 102, a contactless transceiver chip configured to both wirelessly transmit and wirelessly receive data, a contactless transceiver chip configured to both wirelessly transmit and wirelessly receive power, and/or the like. Other types of contactless transmitters, receivers, transceivers, and power terminals may be used in other embodiments. The contactless communication module 112 may include and/or be electrically coupled to one or more antennas, inductive couplers, capacitive couplers, and/or the like for communication with the contactless communication module 114 of the contactless connector 102.

According to various embodiments, the contactless communication module 112 may be electrically connected to the device circuit board of the electronic device 100, for example for transferring data and/or power between the contactless communication module 112 and the device circuit board. In addition or alternatively, the contactless communication module 112 may be electrically connected to a battery (not shown) of the electronic device 100 that is separate from the device circuit board. The contactless communication module 112 is optionally integrated as a component of the device circuit board of the electronic device 100. The contactless communication module 112 is optionally integrated as a portion of the connector interface 106 of the electronic device 100.

Referring again to the contactless connector 102, the contactless connector 102 is optionally provided as part of a cable connector assembly according to a specific embodiment that can be coupled to a host device (not shown), which may have access to a power source for supplying power to the contactless connector 102. In an exemplary embodiment, the contactless connector 102 includes a mechanical securing mechanism 116 and a contactless communication interface 118, which includes the contactless communication module 114 of the contactless connector 102.

In the illustrated embodiment, the contactless connector 102 includes a housing 120 and a cable 122 extending from the housing 120. The housing 120 extends between a mating end 124 and a terminating end 126. Optionally, the terminating end 126 is configured to be terminated to an end of the cable 122; however, the terminating end 126 may be terminated to other components, such as, but not limited to, a peripheral device (e.g., a computer, a docking station, and/or the like). In the illustrated embodiment, the terminating end 126 defines a cable end and will be referred to herein as a cable end 126. The cable 122 extends from the cable end 126 of the housing 120, and also may be provided with a strain relief member. In another specific embodiment, the contactless connector 102 may be terminated to a cable that is pluggable directly into a power socket (not shown). The contactless connector 102 in other embodiments may be terminated to another peripheral device (not shown) which can be coupled to the connector interface 106 of the electronic device 100 so that the peripheral device may be powered by the electronic device 100 or the peripheral device (e.g. docking station) may power the electronic device 100.

The housing 120 has a mating interface 128 at the mating end 124. The mating interface 128 is configured to be coupled to the connector interface 106 of the electronic device 100. Optionally, the housing 120 and mating interface 128 are configured to be reversibly coupled to the connector interface 106 in both a first orientation and in a second orientation, which may be oriented approximately 180° relative to the first orientation. The housing 120 may include any material(s), such as, but not limited to, an electrically insulative material, a plastic, a metal, and/or the like. The material(s) of the housing 120 are optionally molded to provide the appropriate shape, including the mating interface 128, such that there are no exposed conductive contacts.

The housing 120 includes a first surface 130 and a second surface 132 that is opposite the first surface 130. The housing 120 includes a first side 134 and a second side 136 that is opposite the first side 134. In the illustrated embodiment, the first surface 130 defines a top of the housing 120 and the second surface 132 defines a bottom of the housing 120. But, optionally the contactless connector 102 may be flipped (i.e., turned over) and mated with the connector interface 106 of the electronic device 100 in an upside down orientation such that the first surface 130 defines the bottom of the housing 120 and the second surface 132 defines the top of the housing 120.

The contactless communication module 114 of the contactless connector 102 is held at least partially within the housing 120 of the contactless connector 102. The contactless communication module 114 is configured to transmit and/or receive data and/or power. For example, as described below, the connector communication module 114 is configured to wirelessly communicate with the device communication module 112 to wirelessly transfer data and/or power between the electronic device 100 and the contactless connector 102.

The contactless communication module 114 may include any structure, device, and/or the like that enables the contactless communication module 114 to wirelessly communicate with the contactless communication module 112 of the electronic device 100, such as, but not limited to, a contactless transmit chip configured to wirelessly transmit data from the contactless connector 102, a contactless receive chip configured to wirelessly receive data from the electronic device, a contactless transmit chip configured to wirelessly transmit power to the electronic device 100, a contactless power terminal configured to wirelessly transmit power to the electronic device, a contactless transceiver chip configured to both wirelessly transmit and wirelessly receive data, a contactless transceiver chip configured to both wirelessly transmit and wirelessly receive power, and/or the like. Other types of contactless transmitters, receivers, transceivers, and power terminals may be used in other embodiments. The contactless communication module 114 may include and/or be electrically coupled to one or more antennas, inductive couplers, capacitive couplers, and/or the like for communication with the contactless communication module 112 of the electronic device 100. The contactless communication module 114 is optionally integrated as a portion of the mating interface 128 of the contactless connector 102.

The contactless connector 102 optionally includes one or more circuit boards (not shown) held within the housing 120. Various components of the contactless connector 102 (whether shown and/or described herein) may be electrically connected to the circuit board(s) of the contactless connector 102. For example, the cable 122 and/or the contactless communication module 114 may be electrically connected to the circuit board(s) of the contactless connector 102.

Optionally, the contactless connector 102 and/or the electronic device 100 include a radio frequency (RF) absorber (not shown) to reduce interchannel cross talk between transmission lines (i.e., channels) defined by the contactless communication modules 112 and/or 114. Optionally, the contactless connector 102 and/or the electronic device 100 include an electro-magnetic interference (EMI) shield (not shown) to reduce any EMI interference or susceptibility between transmission lines defined by the contactless communication modules 112 and/or 114.

The mechanical securing mechanism 116 of the contactless connector 102 includes an optical contacting element 138, which is held by the housing 120 of the contactless connector 102. As will be described below, the optical contacting element 138 is configured to optically contact an optical contacting element 140 (or the receptacle) of the electronic device 100 to mechanically connect (i.e., physically secure) the contactless connector 102 to the electronic device 100. Specifically, the optical contacting element 138 has an optical contacting surface 142 that is configured to "optically contact" the optical contacting surface 144 of the optical contacting element 140 of the electronic device 100. The "optical contact" between the optical contacting surfaces 142 and 144 mechanically connects (i.e., physically secures) in a particular manner the optical contacting elements 138 and 140 together, which then mechanically connects (i.e., physically secures) the housing 120 of the contactless connector 102 to the electronic device 100 (or the receptacle of the electronic device 100).

For purposes of this disclosure, "optical contact" occurs when two materials are polished sufficiently smooth and sufficiently flat such that when pressed together the materials bond to each other through Van der Waals forces. In other words, the two materials adhere to each other via adhesion and/or stiction when brought sufficiently close (i.e., into sufficiently close contact) to each other such that the two materials slide, rotate, wiggle, and/or the like (i.e., wringle) relative to each other to push air, oil, vapor, and/or the like out from between the interface between the two materials. The bond, adhesion, and/or stiction generated by optical contact may also be referred to as "wringing" ("wringability, wringle, etc."), "clinging", and/or "sticking" (but without any adhesive material composition being used). The bond, adhesion, and/or stiction generated by optical contact is similar to that occurring with stacked gage blocks, which are known for use in inspection and other automotive applications. Optical contacting may occur due to: (1) molecular attraction occurring when two sufficiently flat and sufficiently smooth surfaces are brought into contact; (2) air pressure between the surfaces caused by air being squeezed out of the interface between the surfaces as the surfaces are moved together; and/or (3) surface tension from oil and/or water vapor present between the surfaces. Sufficiently smooth and sufficiently flat surfaces that are configured to optically contact each other may be referred to as "ultra-flat", "ultra-polished", and/or "optically polished" surfaces.

Referring specifically to the optical contacting element 138, the optical contacting surface 142 is configured to optically contact the optical contacting surface 144 of the optical contacting element 140 such that the optical contacting surfaces 142 and 144 bond together through Van der Waals forces. The bond (i.e., the optical contact) between the optical contacting surfaces 142 and 144 mechanically connects (i.e., physically secures) the optical contacting elements 138 and 140 together, which mechanically connects (i.e., physically secures) the housing 120 of the contactless connector 102 to the electronic device 100.

The optical contacting surface 142 of the optical contacting element 138 may have any smoothness that enables the optical contacting surface 142 to function as described and/or illustrated herein (e.g., that enables the optical contacting surface 142 to optically contact the optical contacting surface 144 and thereby mechanically connect the contactless connector 102 to the electronic device 100). According to various specific embodiments, in terms of smoothness, the optical contacting surface 142 should have a surface roughness of less than or equal to approximately 0.025 micrometers (μm) (i.e., approximately 1 microinch (μin)). In other words, in some specific embodiments, the minimum condition for wringability is a surface roughness of approximately 0.025 micrometers (μm) (i.e., approximately 1 microinch (μin)) or better.

The flatness of the optical contacting surface 142 of the optical contacting element 138 may have any value that enables the optical contacting surface 142 to function as described and/or illustrated herein. For example, the flatness of the optical contacting surface 142 of the optical contacting element 138 may have any value that enables the optical contacting surface 142 to optically contact the optical contacting surface 144 and thereby mechanically connect the contactless connector 102 to the electronic device 100. According to various specific embodiments, in terms of flatness, the optical contacting surface 142 should have a surface flatness of less than or equal to approximately 0.127 micrometers (μm) (i.e., approximately 5 microinches (μin)). In other words, in some specific embodiments, the minimum condition for wringability is a surface flatness of at least approximately 0.127 micrometers (μm) (i.e., approximately 5 microinch (μin)).

The optical contacting element 138 may be fabricated from any material(s) that enables the optical contacting surface 142 to function as described and/or illustrated herein (e.g., that enables the optical contacting surface 142 to optically contact the optical contacting surface 144 and thereby mechanically connect the contactless connector 102 to the electronic device 100). Examples of material from which the optical contact element 138 may be fabricated include, but are not limited to, ceramic, synthetic sapphire, hardened premium steel, a carbide, boron carbide, chromium carbide, tungsten carbide, silicon carbide, a glass (e.g., a relatively tough glass such as, but not limited to, Dragontail® glass, Gorilla® glass, and/or the like), and/or the like.

The material(s) used to fabricate the optical contact element 138 may be selected based on a hardness of the material that provides the optical contacting element 138 with the capability of maintaining the properties (e.g., smoothness, flatness, and/or the like) of the optical contacting surface 142 over repeated use and time, which may provide the contactless connector 102 and/or the electronic device 100 with a greater durability, reliability, service life, and/or the like. The size, thickness, and/or the like of the optical contact element 138 may be selected to provide the optical contacting element 138 with the capability of maintaining the surface properties (e.g., smoothness, flatness, and/or the like) of the optical contacting surface 142 over repeated use and time, which may provide the contactless connector 102 and/or the electronic device 100 with a greater durability, reliability, service life, and/or the like. For example, for an optical contacting element 138 having a size of approximately five millimeters (mm) wide by approximately nine millimeters (mm) long, the optical contacting element 138 may be provided with a thickness of at least approximately 0.5 millimeters (mm) to provide and/or maintain a surface flatness of equal to or less than approximately 0.127 micrometers (μm) (i.e., approximately 5 microinches (μin)) over repeated use and time.

The material(s) of the optical contacting element 138 may be selected to be non-conductive such that the optical contacting element 138 does not interfere with the wireless communication between the contactless communication modules 112 and 114. For example, the material(s) of the optical contacting element 138 may be transparent and/or non-conductive to RF and/or other operating electromagnetic transmissions.

In the illustrated embodiment, the optical contacting element 138 includes a plate that is formed from a sheet of material (e.g., laser cut and polished ceramic). But, the optical contact element 138 additionally or alternatively may be fabricated from a structure having any other geometry and/or the like, such as, but not limited to, a substrate, a block, a stock, and/or the like. The optical contacting element 138 may be fabricating using any manufacturing method, process, and/or the like, such as, but not limited to, cutting and forming, stamping and forming, flame fusion, relatively high-temperature fusion, sintering melt growth, solution growth, relatively high-temperature growth, relatively high-pressure growth, pressing, extruding, casting, molding, injection molding, cutting, and/or the like.

Moreover, in the illustrated embodiment, the optical contacting element 138 has the general shape of a rectangular cuboid or parallelepiped. But, the optimal contacting element 138 may additionally or alternatively include any other geometry (e.g., shape) that enables the optical contacting element 138 to function as described and/or illustrated herein (e.g., that enables the optical contacting element 138 to optically contact the optical contacting element 140 and thereby mechanically connect the contactless connector 102 to the electronic device 100). The optical contacting surface 142 of the optical contacting element 138 may have any surface area that enables the optical contacting element 138 to function as described and/or illustrated herein. For example, the optical contacting surface 142 may have any surface area that enables the optical contacting element 138 to optically contact the optical contacting element 140 and thereby mechanically connect the contactless connector 102 to the electronic device 100. To the extent possible for the physical configuration in a given situation, a larger optical contacting surface provides better optical contact bonding. The optical contacting elements 138 and/or 140 each may have only one optical contacting surface (i.e., the surface that is to mate with the other optical contacting element) with the required surface properties (e.g., smoothness, flatness, and/or the like). In other words, in some embodiments, the optical contacting element 138 and/or 140 may have one or more other surfaces (in addition to the respective optical contacting surfaces 142 and/or 144) that do not necessarily have the required surface properties that enable wringability. For example, such other surfaces may not be polished to have the sufficient surface properties for wringability to provide better adhesion, overmolding, mechanical retention, fitting, and/or the like of the optical contacting element 138 and/or 140 with respect to (e.g., within, on, and/or the like) the respective housing 120 and/or 104. Moreover, and for example, the non-mating surface(s) (i.e., such other surfaces described above) may have protrusions, indentations, footings, and/or the like to better enable overmolding or fastening of the element 138 and/or 140 to the respective housing 120 and/or 104.

In the illustrated embodiment, the optical contacting element 138 is held by the housing 120 of the contactless connector 102 along the mating end 124 of the housing 120. Moreover, in the illustrated embodiment, the optical contacting element 138 extends within the mating interface 128 of the contactless connector 102. But, additionally or alternatively, the optical contacting element 138 may extend at any other location(s) along the housing 120 than at the mating end 124 and/or than within the mating interface 128, including locations that are outside of the mating interface 128 of the contactless connector 102. For example, in some embodiments, the mechanical securing mechanism 116 of the contactless connector 102 includes at least two optical contacting elements 138 that straddle the mating interface 128 on opposite sides of the mating interface 128.

Although shown as being offset from an end surface 146 of the mating end 124 of the housing 120, the optical contacting surface 142 of the optical contacting element 138 may extend approximately flush with the end surface 146. Optionally, the optical contacting element 138 is formed as a single, unitary structure with at least a portion of the housing 120 (e.g., the material(s) of the housing 120 may be fabricated from one or more of the above material examples of the optical contacting element 138). Optionally, in embodiments wherein the optical contacting element 138 is formed as a single, unitary structure with at least a portion of the housing 120, only the location(s) of the optical contacting element 138 that are configured to optically contact the optical contacting element 140 (e.g., that are sufficient to mechanically connect the contactless connector 102 to the electronic device 100) are polished to have the required surface properties for wringability. For example, if the housing 120 itself were made from synthetic sapphire then only those areas intended for optical contact bonding could be made to the required smoothness and/or flatness.

Although the illustrated embodiment includes only a single optical contacting element 138, the mechanical securing mechanism 116 of the contactless connector 102 may include any number of optical contacting elements 138 that enables the mechanical securing mechanism 116 to function as described and/or illustrated herein (e.g., that enables the optical contacting element 138 to optically contact the optical contacting element 140 and thereby mechanically connect the contactless connector 102 to the electronic device 100).

The mechanical securing mechanism 108 of the electronic device 100 includes the optical contacting element 140, which is held by the housing 104 of the electronic device 100. The optical contacting element 140 is configured to optically contact the optical contacting element 138 of the contactless connector 102 to mechanically connect (i.e., physically secure) the contactless connector 102 to the electronic device 100. Specifically, the optical contacting surface 144 of the optical contacting element 140 is configured to optically contact the optical contacting surface 142 of the optical contacting element 138 of the contactless connector 102 such that the optical contacting surfaces 142 and 144 bond together through Van der Waals forces. The bond (i.e., the optical contact) between the optical contacting surfaces 142 and 144 mechanically connects (i.e., physically secures) the optical contacting elements 138 and 140 together, which mechanically connects (i.e., physically secures) the housing 120 of the contactless connector 102 to the electronic device 100.

The optical contacting surface 144 of the optical contacting element 140 may have similar surface properties (e.g., smoothness, flatness, and/or the like), hardness, material(s), size, thickness, shape, geometry, other properties, and/or the like as described above with respect to the optical contacting element 138 and the corresponding optical contacting surface 142.

In the illustrated embodiment, the optical contacting element 140 is held by the housing 104 of the electronic device 100 along a mating end 148 of the housing 104 and the optical contacting element 140 extends within the connector interface 106 of the electronic device 100. But, additionally or alternatively, the optical contacting element 140 may extend at any other location(s) along the housing 104 than at the mating end 148 and/or than within the connector interface 106, including locations that are outside of the connector interface 106. For example, in some embodiments, the mechanical securing mechanism 108 of the electronic device 100 includes at least two optical contacting elements 140 that straddle the connector interface 106 on opposite sides of the connector interface 106.

Although shown as being offset from an end surface 150 of the mating end 148 of the housing 104, the optical contacting surface 144 of the optical contacting element 140 may extend approximately flush with the end surface 150. Optionally, the optical contacting element 140 is formed as a single, unitary structure with at least a portion of the housing 104 of the electronic device 100. Optionally, in embodiments wherein the optical contacting element 140 is formed as a single, unitary structure with at least a portion of the housing 104, only the location(s) of the optical contacting element 140 that are configured to optically contact the optical contacting element 138 (e.g., that are sufficient to mechanically connect the contactless connector 102 to the electronic device 100) are polished to have the required surface properties for wringability. For example, if the housing 104 itself were made from synthetic sapphire then only those areas intended for optical contact bonding could be made to the required smoothness and/or flatness.

Although the illustrated embodiment includes only a single optical contacting element 140, the mechanical securing mechanism 108 of the electronic device 100 may include any number of optical contacting elements 140 that enables the mechanical securing mechanism 108 to function as described and/or illustrated herein (e.g., that enables the optical contacting element 140 to optically contact the optical contacting element 138 and thereby mechanically connect the contactless connector 102 to the electronic device 100).

Optionally, the electronic device 100 and/or the contactless connector 102 may include alignment features, such as, but not limited to, ribs, tabs, protrusions, slots, grooves, keys, key slots, and/or the like to align the optical contacting elements 138 and 140 for proper mating. Improving the accuracy of the alignment of the optical contacting elements 138 and 140 may provide more efficient power and/or signal transmission between the electronic device 100 and the contactless connector 102.

Figure 2:
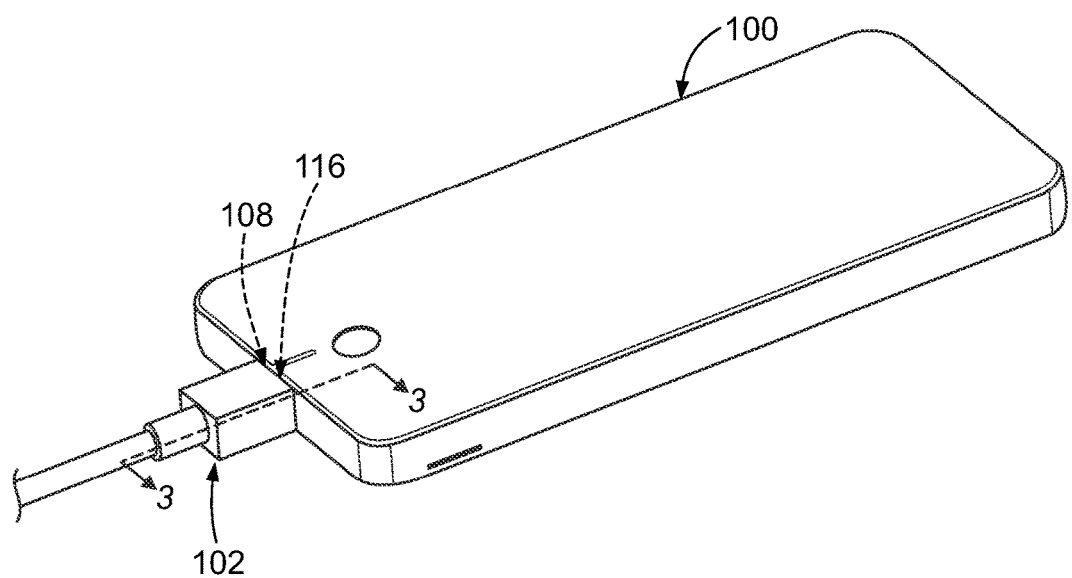
FIG. 2 is a perspective view of the electronic device showing the contactless connector coupled thereto, according to the embodiment of FIG. 1.

FIG. 2 is a perspective view of the electronic device 100 showing the contactless connector 102 coupled thereto. As shown in FIG. 2, the contactless connector 102 is coupled to the electronic device 100 using the respective mechanical securing mechanisms 116 and 108. In other words, the contactless connector 102 is mechanically connected to the electronic device 100 using the mechanical securing mechanisms 116 and 108. The mechanical connection between the mechanical securing mechanisms 116 and 108 is provided by the optical contact between the respective optical contacting elements 138 and 140 (shown in FIGS. 1 and 3), which is better illustrated in FIG. 3.

Figure 3:
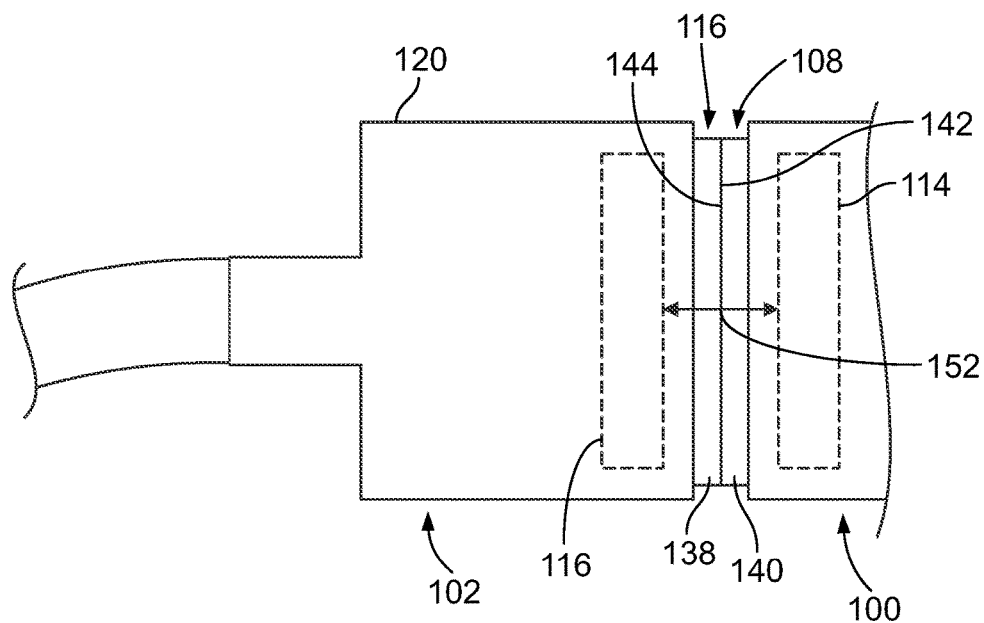
FIG. 3 is a cross-sectional view taken along line 3-3 of FIG. 2 illustrating the contactless connector coupled to the electronic device.

FIG. 3 is a cross-sectional view taken along line 3-3 of FIG. 2. As shown in FIG. 3, the optical contacting element 138 of the mechanical securing mechanism 116 of the contactless connector 102 is in optical contact with the optical contacting element 140 of the mechanical securing mechanism 108 of the electronic device 100. Specifically, the optical contacting surface 142 of the optical contacting element 138 is in optical contact with the optical contacting surface 144 of the optical contacting element 140 such that the optical contacting surfaces 142 and 144 are bonded together through Van der Waals forces. The optical contacting surfaces 142 and 144 are mechanically connected (i.e., physically secured) together via the bond (i.e., the optical contact) between the optical contacting surfaces 142 and 144. The housing 120 of the contactless connector 102 is mechanically connected (i.e., physically secured) to the electronic device 100 via the mechanical connection (i.e., via the optical contact) between the optical contacting surfaces 142 and 144.

The contactless connector 102 and the electronic device 100 may be mechanically connected together by the optical contact between the optical contacting elements 138 and 140 with any engagement force. In other words, the optical contacting elements 138 and 140 may be configured to mechanically connect the housing 120 of the contactless connector 102 to the electronic device 100 with any engagement force. Examples of the engagement force provided by the optical contacting elements 138 and 140 include, but are not limited to, at least approximately five newtons (N), at least approximately 10 N, at least approximately 15 N, at least approximately 20 N, and/or the like. In some embodiments, the engagement force provided by the optical contacting elements 138 and 140 does not degrade over the service life of the contactless connector 102 or degrades much less than at least some connectors over the service life thereof.

The smoothness, flatness, material(s), geometry, location(s), thickness, size, and/or number of each of the optical contacting elements 138 and 140, and/or the surface area of the optical contacting surfaces 142 and/or 144, may be selected to provide any predetermined engagement force of the mechanical connection between the contactless connector 102 and the electronic device 102. In some embodiments, a greater surface area of the optical contacting surfaces 142 and/or 144 provides a greater engagement force. In some embodiments, the smoothness, flatness, material(s), geometry, location(s), thickness, size, and/or number of each of the optical contacting elements 138 and 140, and/or the surface area of the optical contacting surfaces 142 and/or 144, may be selected to provide an engagement force that does not degrade (or degrades much less) over the service life of the contactless connector 102.

When the contactless connector 102 is mechanically connected to the electronic device 100 by the optical contact elements 138 and 140 as shown in FIGS. 2 and 3, the contactless communication modules 112 and 114 of the electronic device 100 and the contactless connector 102, respectively, are configured to wirelessly communicate with each other (i.e., wirelessly transfer data and/or power therebetween). For example, the contactless communication modules 112 and 114 may be aligned with each other to configure the modules 112 and 114 for the wireless communication with each other. When the contactless connector 102 and the electronic device 100 are mechanically connected together by the optical contacting elements 138 and 140 as shown in FIGS. 2 and 3, the wireless communication between the contactless communication modules 112 and 114 configures the modules 112 and 114 to wirelessly transfer data and/or power between the electronic device 100 and the contactless connector 102.

In the illustrated embodiment, the contactless communication modules 112 and 114 are configured to wirelessly communicate (i.e., wirelessly transfer data and/or power) through the optical contacting elements 138 and 140. Specifically, as shown in FIG. 3, the optical contacting elements 138 and 140 are positioned relative to the respective contactless communication modules 114 and 112 such that a communication path 152 between the modules 114 and 112 extends through the optical contacting elements 138 and 140. Alternatively, the optical contacting elements 138 and 140 are positioned relative to the respective contactless communication modules 114 and 112 such that the communication path 152 between the modules 114 and 112 does not extend through the optical contacting elements 138 and/or 140. As mentioned above, the material(s) of each of the optical contacting elements 138 and/or 140 may be selected such that the optical contacting elements 138 and/or 140 do not interfere with the wireless communication between the contactless communication modules 112 and 114.

As discussed above, the contactless connector 102 optionally may be mechanically connected to the electronic device 100 in multiple orientations. For example, the contactless connector 102 may be flipped approximately 180° degrees for a right-side up or an upside down connection with the electronic device 100. In such embodiments wherein the contactless connector 102 can be mechanically connected to the electronic device 100 in multiple orientations, the contactless communication modules 112 and 114 may be capable of wireless communicating with each other in each of the multiple orientations. In embodiments wherein the contactless connector 102 can be mechanically connected to the electronic device 100 in only a single orientation, the electronic device 100 and/or the contactless connector 102 may be marked with an indicator (not shown) that indicates the proper relative orientation of the contactless connector 102 and the electronic device 100. Optionally, the contactless connector 102 and/or the electronic device 100 is provided with a physical keying mechanism (not shown) so that single orientation use is required. Any other relative orientation between the contactless connector 102 and the electronic device 100 may be used in addition or alternatively to the right-side up and/or upside down orientations described and/or illustrated herein.

The optical contacting elements described and/or illustrated herein may occupy less space within a contactless connector (e.g., the contactless connector 102 shown in FIGS. 1-3) and/or within an electronic device (e.g., the electronic device 100 shown in FIGS. 1-3) as compared to at least some known mechanisms for mechanically connecting a connector to an electronic device. The optical contacting elements described and/or illustrated herein do not interfere with functionality of an electrical device and/or a connector.

The optical contacting elements described and/or illustrated herein may provide a contactless connector and/or an electrical device with a greater durability, reliability, service life, and/or the like as compared to at least some known mechanisms for mechanically connecting a connector to an electronic device. For example, the optical contacting elements described and/or illustrated herein may be capable of maintaining the smoothness and/or flatness of the optical contacting surfaces thereof over repeated use and time (i.e., over the service life of the contactless connector and/or the electronic device). Moreover, and for example, the engagement force provided by the optical contacting elements described and/or illustrated herein may not degrade over the service life of the contactless connector 102 or may degrade much less than at least some known mechanisms for mechanically connecting a connector to an electronic device. Another example is that there are no exposed conductive contacts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A contactless connector comprising:
a housing extending between a mating end and a terminating end, the housing having a mating interface at the mating end configured to be coupled to a connector interface of an electronic device;
a connector communication module held at least partially within the housing, the connector communication module being operable in at least one of a transmit mode of operation or a receive mode of operation, wherein the connector communication module is configured to wirelessly communicate with a device communication module of the electronic device to wirelessly transfer at least one of data or power between the connector communication module of the contactless connector and the device communication module of the electronic device; and an optical contacting element held by the housing, wherein the optical contacting element includes a planar, flat optical contacting surface configured to optically contact an optical contacting element of the electronic device in an optical contact bonding arrangement to form a molecular attraction between the optical contacting element and the optical contact element of the electronic device sufficient to hold the optical contacting elements together by adhesion forces such that the housing is mechanically connected to the electronic device by the optical contacting element with the connector communication module configured to wirelessly communicate with the device communication module through the optical contacting element.

2. The contactless connector of claim 1, wherein the optical contacting element of the contactless connector is at least one of transparent or non-conductive to electromagnetic waves to allow the connector communication module to wirelessly communicate with the device communication module and the optical contacting element being non-conductive to light transmission.

3. The contactless connector of claim 1, wherein the optical contacting surface is configured to bond with the optical contacting element of the electronic device through Van der Waals forces, the optical contacting surface having a surface roughness of equal to or less than approximately 0.025 micrometers (μm).

4. The contactless connector of claim 1, wherein the optical contacting surface is flat and configured to bond with the optical contacting element of the electronic device through Van der Waals forces, the optical contacting surface having a surface flatness of equal to or less than approximately 0.127 micrometers (μm).

5. The contactless connector of claim 1, wherein the optical contacting element of the contactless connector is configured to optically contact the optical contacting element of the electronic device such that the housing is mechanically connected to the electronic device with an engagement force of at least approximately five newtons (N).

6. The contactless connector of claim 1, wherein the optical contacting element comprises a plate formed from a sheet of material.

7. The contactless connector of claim 1, wherein the optical contacting element of the contactless connector comprises at least one of ceramic, synthetic sapphire, hardened premium steel, a carbide, boron carbide, chromium carbide, tungsten carbide, silicon carbide, or a glass.

8. The contactless connector of claim 1, wherein the connector communication module of the contactless connector is configured to wirelessly transfer at least one of data or power through the optical contacting elements of the contactless connector and the electronic device.

9. The contactless connector of claim 1, wherein the optical contacting element of the contactless connector is held by the housing along the mating end such that the optical contacting element extends at least partially within the mating interface.

10. The contactless connector of claim 1, wherein the optical contacting element of the contactless connector is formed as a single, unitary structure with at least a portion of the housing.

11. The contactless connector of claim 1, wherein the optical contacting element of the contactless connector is configured to optically contact the optical contacting element of the electronic device in both a first orientation and a second orientation that is oriented approximately 180° relative to the first orientation such that the mating interface of the housing is configured to be reversibly coupled to the connector interface in both the first orientation and the second orientation.

12. The contactless connector of claim 1, wherein the termination end of the housing is configured to be terminated to an end of a cable.

13. A contactless connector comprising:
a housing extending between a mating end and a terminating end, the housing having a mating interface at the mating end configured to be coupled to a connector interface of an electronic device;
a connector communication module held at least partially within the housing, the connector communication module being operable in at least one of a transmit mode of operation or a receive mode of operation, wherein the connector communication module is configured to wirelessly communicate with a device communication module of the electronic device to wirelessly transfer at least one of data or power between the connector communication module of the contactless connector and the device communication module of the electronic device; and
an optical contacting element held by the housing, the optical contacting element having a planar optical contacting surface that is configured to abut against and bond with a planar optical contacting element of the electronic device sufficient to hold the optical contacting elements together by adhesion forces such that the housing is mechanically connected to the electronic device with the connector communication module configured to wirelessly communicate with the device communication module.

14. The contactless connector of claim 13, wherein the optical contacting element of the contactless connector is at least one of transparent or non-conductive to electromagnetic waves to allow the connector communication module to wirelessly communicate with the device communication module.

15. The contactless connector of claim 13, wherein the optical contacting surface has a surface roughness of equal to or less than approximately 0.0125 micrometers (μm).

16. The contactless connector of claim 13, wherein the optical contacting surface is flat having a surface flatness of equal to or less than approximately 0.127 micrometers (μm).

17. The contactless connector of claim 13, wherein the optical contacting surface of the optical contacting element of the contactless connector comprises at least one of ceramic, synthetic sapphire, hardened premium steel, a carbide, boron carbide, chromium carbide, tungsten carbide, silicon carbide, or a glass.

18. The contactless connector of claim 13, wherein the optical contacting surface of the optical contacting element of the contactless connector is configured to bond with the optical contacting element of the electronic device such that the housing is mechanically connected to the electronic device with an engagement force of at least approximately five newtons (N).

19. The contactless connector of claim 13, wherein the optical contacting surface of the optical contacting element of the contactless connector is configured to bond with the optical contacting element of the electronic device through Van der Waals forces.

20. A contactless connector comprising:
a housing extending between a mating end and a terminating end, the housing having a mating interface at the mating end configured to be coupled to a connector interface of an electronic device;
a connector communication module held at least partially within the housing, the connector communication module being operable in at least one of a transmit mode of operation or a receive mode of operation, wherein the connector communication module is configured to wirelessly communicate with a device communication module of the electronic device to wirelessly transfer at least one of data or power between the connector communication module of the contactless connector and the device communication module of the electronic device; and
an optical contacting element held by the housing, wherein the optical contacting element includes a planar, flat optical contacting surface configured to mechanically connect with an optical contacting element of the electronic device to molecularly bond the optical contacting element to the optical contact element of the electronic device sufficient to hold the optical contacting elements together by adhesion forces such that the housing is mechanically connected to the electronic device, the optical contacting elements of the contactless connector and the electronic device being at least one of transparent or non-conductive to radio frequency waves to allow the connector communication module to wirelessly transfer at least one of data or power through the optical contacting elements of the contactless connector and the electronic device.

* * * * *